United States Patent [19]
Mesnet et al.

[11] 3,790,111
[45] Feb. 5, 1974

[54] APPARATUS FOR DOCKING A HELICOPTER

[75] Inventors: Jean Dominique François Gérard Mesnet, Vaucresson; Philippe Marie Antoine Jacques Remon-Beauvais, Ris Orangis; Jean François Barbarin, Ruelle; Raymond Louis Le Guennec, Lorient; Georges Edouard Louis Leon Dadon, Kremlin-Bicetre, all of France

[73] Assignee: Etat Francais, Paris, France

[22] Filed: Oct. 2, 1972

[21] Appl. No.: 294,002

[30] Foreign Application Priority Data
Oct. 1, 1971 France .................. 71.35383

[52] U.S. Cl. .................. 244/116
[51] Int. Cl. .................. B64f 1/12
[58] Field of Search ........ 244/116, 115, 114, 17.17; 214/14, 1 BB, 1 CM, 1 B; 212/21, 10, 11; 188/43, 42, 41; 269/17, 71, 73; 280/441

[56] References Cited
UNITED STATES PATENTS
3,294,252  12/1966  Hosoi et al. .................. 212/10
3,659,813  5/1972  Mesnet et al. .................. 244/116
3,570,684  3/1971  Cowan .................. 212/10 X
2,360,470  10/1944  Brown .................. 244/116 X FOREIGN PATENTS OR APPLICATIONS
1,479,123  3/1967  France .................. 188/43

Primary Examiner—George E. A. Halvosa
Attorney, Agent, or Firm—Eric H. Waters et al.

[57] ABSTRACT

A device for displacing an object on a horizontal surface, which can tilt and oscillate, along a desired trajectory between any two points. The trajectory is derived from a lengthwise motion of a cross beam, generated by a driving mechanism entirely independent of the cross beam and by a transverse motion of a cross slide on the cross beam, the transverse motion being obtained from the load component acting upon the cross beam due to a manual or mechanical orientation of the load itself. The orientation is obtained, as required, by a means external to the device.

11 Claims, 8 Drawing Figures

APPARATUS FOR DOCKING A HELICOPTER

BACKGROUND

1. Field of the Invention

The invention relates to improvements in handling devices for vehicles and particularly to the docking of helicopters on a flat surface while maintaining a connection at all times with the helicopter.

2. Prior Art

In U. S. Pat. No. 3,659,813 there is disclosed a handling device intended for the displacement of loads or vehicles in one plane, according to trajectories defined by the co-action, at selected speed ratios, of two basic displacements located in said plane; these displacements can be supplemented by an angular orientation of the load or vehicle with respect to the trajectory, the connection between the vehicle and handling device always being maintained.

The aforesaid patent is specifically concerned with a handling device by which a helicopter can be displaced on the deck of a ship from any point to one of two predetermined locations within the range served by the device.

The helicopter displacement is obtained by the longitudinal displacement of a cross beam fitted with a cross slide; the latter is provided with a cross bar for the attachment of the helicopter. The lateral motion of the cross slide is associated with that of the cross beam in a speed ratio of $k$, $o$ or $-k$. Consequently, the helicopter trajectory is made up of a succession of straight lines, parallel to the longitudinal axis of the ship or inclined thereto through an angle $\pm\alpha$. The trajectory includes rotations at the points of change of direction to place the helicopter parallel with the straight course to be maintained.

The cross beam is made integral with the ship structure through two carrier and drive carriages moving in two longitudinal pits. These pits are located under the deck of the ship and each is provided with a narrow slot for the passage of linking elements between the carriage and the cross beam. The cross beam drive on the ship structure is effected through toothed gears which mesh with a rack located in each pit.

Each carriage includes a motor supplied with compressed air, both motors being mechanically synchronized through a synchronizing shaft incorporated in the cross beam.

A mechanical drive is actuated by the synchronizing shaft and controls, in the given ratio, the cross slide motion is obtained by means of a worm, screw-nut assembly. An unclutching system allows the cross slide to be separately driven by an auxiliary motor when the cross beam is stationary.

The cross bar may be angularly adjusted about an axis corresponding to the helicopter rotation axis, thus enabling the helicopter to be rotated on its tires without slipping.

A vertical lifting device is located at the rear of the deck to permit the cross beam, the cross slide and the cross bar to be retracted so as to be fully clear of the deck.

Self-powering of the cross beam-cross slide assembly requires supply of the motor during their displacement, this being particularly difficult in the case of an electrical, hydraulic or pneumatic supply, on the one hand, and requiring the provision under the handling area of an installation of heavy and bulky material which is excessive for low tonnage ships if the handling area is to be fully cleared, on the other hand.

As the trajectory results from the combination in a given ratio of the cross beam motion and that of the cross slide fitted thereon, the device therefore requires a trajectory which is straight and predetermined. The achievement of a device capable of orienting a helicopter so as to place it at any course would involve the adoption of expensive and sophisticated devices, such as course computers and speed change units.

SUMMARY OF THE INVENTION

An object of the invention is to provide a device which overcomes the above drawbacks by a construction in which the orientation given to the load (vehicle or aircraft) enables it at any moment to hold the desired trajectory, the cross beam being moved longitudinally while the cross slide only follows the movement. The use of pits and mobile motors become unnecessary, thus affording an appreciable reduction in weight of the device. In the event that a helicopter is to be handled on a deck or inside the hangar of a ship, it is possible, for instance, to obtain the desired trajectory by simply steering the helicopter nose wheel.

The invention is directed to a handling device comprising: a cross beam coupled with the handling area through multiple carriage systems which are moved in rails under the action of a driving mechanism which is independent of said cross beam. The basic function of the carriage systems is to equally distribute the developed loads thus allowing the use of low hardness friction materials, such as plastics.

a cross slide including helicopter attachment means and freely movable on the cross beam, the displacement of the cross slide being effected by the thrust or tensile load component acting upon the cross beam; the component results from the orientation of the helicopter itself and, especially, from the steering of the nose wheel by the pilot or a towing bar.

The cross slide may be braked, as required, in order to avoid undue helicopter slipping which might be caused by high amplitude movements of the handling area.

A suitable braking device may comprise a set of multiple blades provided on the cross beam and adapted for being brought into contact with a second set of blades under the action of a spring system.

Release of the braking device is obtained by a mechanical, hydraulic or other appropriate actuation means. The helicopter slipping may be prevented by the implementation of any other suitable braking device.

The helicopter retainer comprises a cross bar allowed to follow the rotation imparted to the helicopter and to limit said rotation to a predetermined value. The cross bar is equipped with dampers to attenuate the dynamic loads exerted upon the mechanical assembly in the case of a sudden blocking of the helicopter or cross slide.

The cross bar guidance is ensured by single, double or multiple carriages provided with hinged pads which slide in very small rails so as not to impair taxiing on the deck.

Both sides of the carriage supports are secured to towing elements consisting, for instance, of steel strips connected to a driving device including winding drums and motors; the installation and power supply of the latter are such that said towing elements are permanently tensioned so as to prevent the effects of the deck movements from affecting the helicopter displacement.

DETAILED DESCRIPTION

Figure 1:
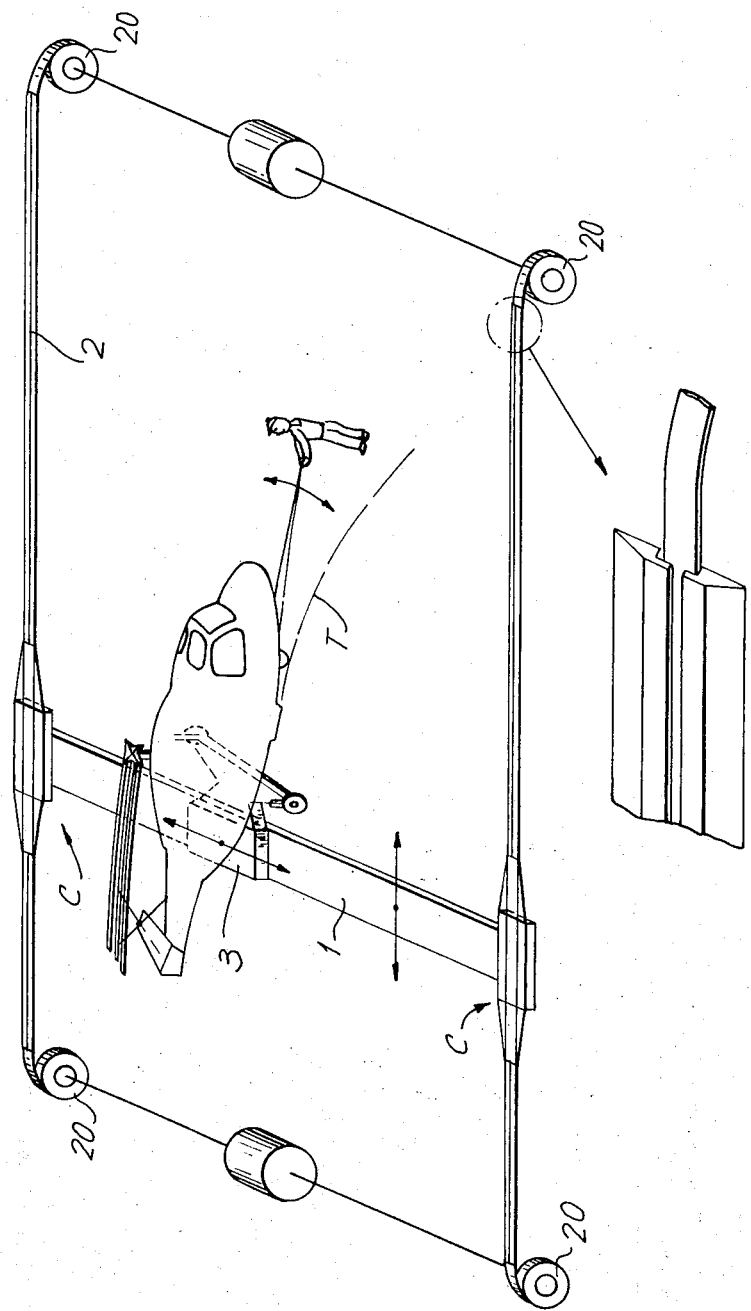
FIG. 1 is a schematic perspective view of a device according to the invention.

In the drawing there is seen a cross beam 1 which is a rigid member each end of which is secured to mobile carriages C through a vertical pin 4 serving as a hinge. One of the hinges 4 is provided with lateral clearance in order to allow relative shifting of both carriages or to overcome snug fit tolerances.

Each carriage C consists of a core R, at the front and rear ends of which are mounted yokes 5. Two pads 7 are mounted on yokes 5 through hinge pins 6. The pads 7 slide on rails 2. The yokes 5 are connected to the core R by means of ball joints 8. The pads 7 are fitted with readily detachable friction plates 9 to ensure contact both in the vertical and lateral directions with rail 2. This arrangement affords an equal distribution of the loads, a minimum space in height and an appropriate slipping despite unavoidable rail misalignments and distortions of the deck. In addition, it allows the device to be installed on a curved deck.

Figure 4:
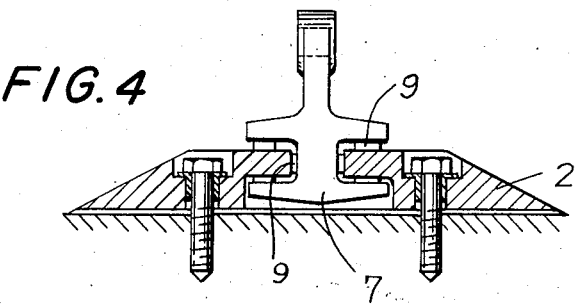
FIG. 4 is a transverse sectional view of the rails together with the sliding pads.
Figure 5:
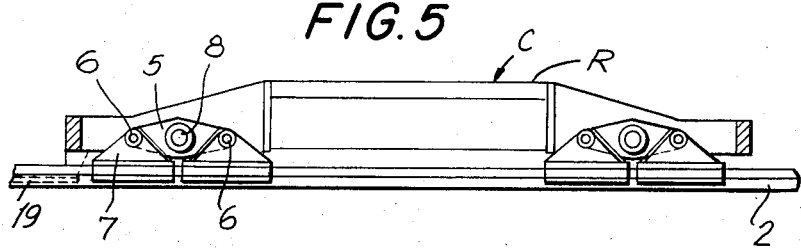
FIG. 5 is a longitudinal sectional view showing the cross beam support and carriages.
Figure 6:
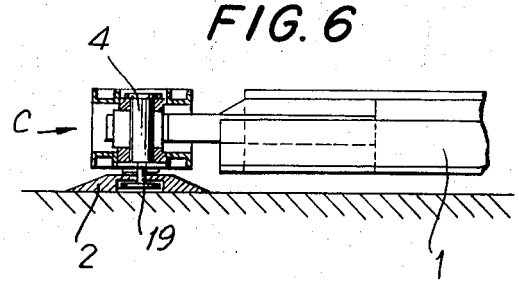
FIG. 6 shows the attachment of the cross beam to one of its bearing blocks.

The pads 7 slide on rails 2 which are made in sections bolted to the flat deck. The rail height is less than 30 millimeters. The rail profile is best seen in FIG. 4 and is designed to facilitate the taxiing of a helicopter without any risk of damage of the tires.

Figure 3:
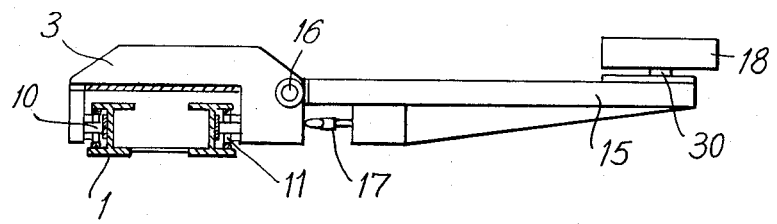
FIG. 3 is a sectional view of the cross beam showing the cross slide fitted with the cross bar support and the cross bar.

A cross slide 3 is movable on cross beam 1 via rollers 10 and 11 (FIG. 3). One of the ends of the cross slide is fitted with a block 12 provided with a braking device which includes blades 23 adapted to be pressed against blades or friction strips 13 stretched all along the cross beam 1. The blades 23 are coupled to and are actuated by a piston 25 of a jack 24 which is subjected to the action of a spring 26 at one side and to a brake release system at its other side.

Figure 7:
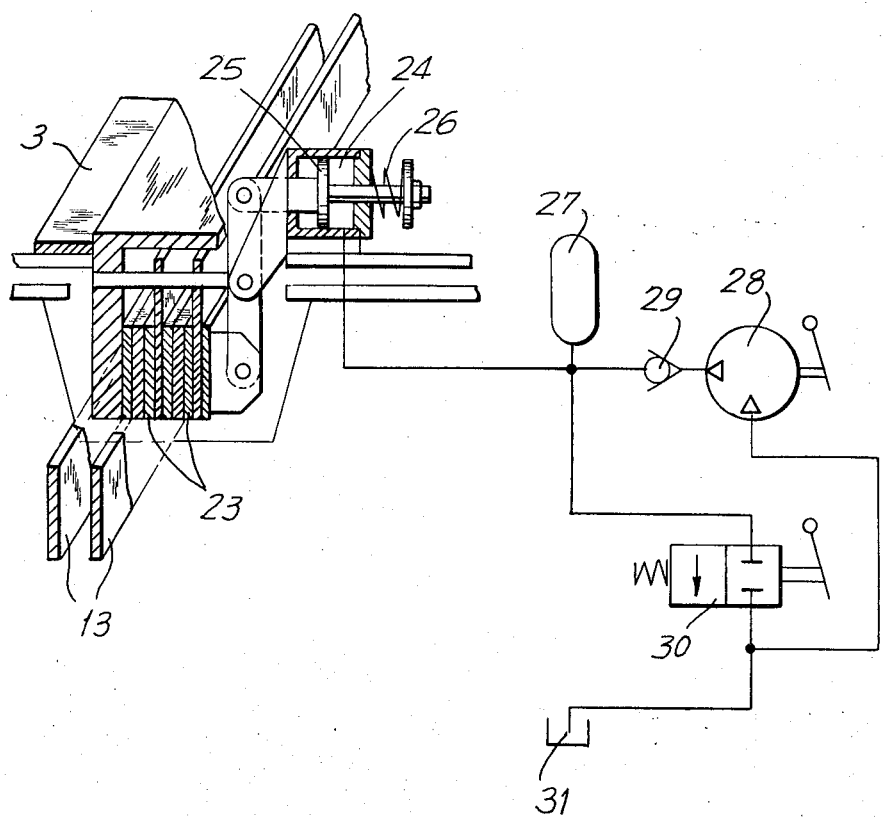
FIG. 7 is a schematic arrangement of a braking device for the cross slide.
Figure 8:
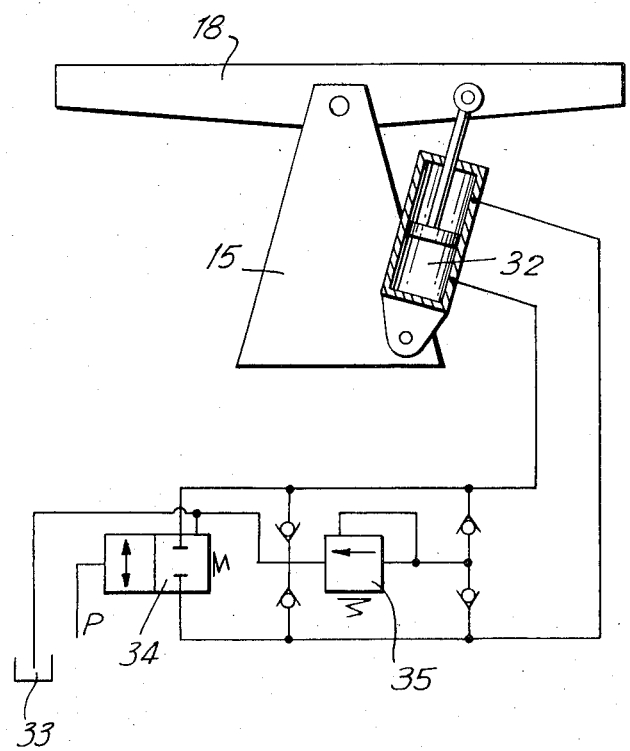
FIG. 8 is a schematic arrangement of a shock absorbing means for the cross beam.

In the rest position, the cross slide is normally braked, the blades 23 of the braking device being applied against blades 13 under the action of spring 26. Brake release is obtained by actuating the brake release device, the control of which may be either hydraulic, electrical, mechanical, pneumatic or otherwise. In the schematically illustrated embodiments in FIG. 7, the brake release system comprises a hand pump 28 supplied from a tank 31, whereby pressure can be applied to piston 25 through a non-return valve 29 and an accumulator-buffer 27. Such pressure is produced only when a slide valve 30 is pushed manually. As soon as the operator releases the valve 30, the pressure is reduced behind the piston, whereupon the device is again braked under the action of the spring 26.

Cross slide 3 also incorporates a lock 14 fitted with shock absorbing springs, and a lock pin of lock 14 is allowed to engage in bushings provided at intervals of every 50 centimeters, or the like, on cross beam 1.

Support 15 of a cross bar 18 is coupled with cross slide 3 via a hinge pin 16 extending parallel to the cross slide 1. The support 15 is either in contact with the cross slide through a damping device 17, the end of which bears a roller, or with the ship's deck through a steerable roller mounted on a screw-jack allowing easy height adjustment of the cross bar.

The cross bar 18 is provided with appropriate means for attachment to the main landing gear wheels of a helicopter. The cross bar is connected to support 15 through a pin 30 integral with the latter. The cross bar 18 is free to rotate within a ±15° quadrant with respect to an axis perpendicular to the ship. At the ends of travel, however, shock absorbing means are installed to avoid impacts which could occur during the handling operations.

The shock absorbing means may be constituted by a jack 32 connected to a hydraulic circuit comprising a tank 33 which serves as a pressurizing source, a spring-biassed slide valve 34 actuated hydraulically under the action of pressure P, and a gauged safety valve 35.

Under the action of pressure P, the slide valve 34 allows passage of oil which equalizes the pressure on each of the piston surfaces in jack 32. As a result of the swinging movement of the cross bar, the pressure increases sharply on one of the piston surfaces, thereby producing a damping, and a return of oil at the other piston surface via the safety valve 35.

The cross bar 18 can move about a horizontal axis to follow the roll movements, therefore allowing any difference in height between the helicopter wheel axles to be taken up.

The driving mechanism for the cross beam 1 comprises four steel strips 19 attached to the carriages C, and to four winding drums 20. The drums, located at each end of the handling area, are driven by pairs of drive units, each pair being actuated by a hydraulically controlled towing motor 21 and tension motor 22. These motors are equipped with hydraulic release brakes which are used to stop the system in the absence of pressure.

The hydraulic system is so constructed that the steel strips are permanently tensioned above a given minimum value in order to ensure a correct winding up on the drums, while if the helicopter becomes motive, the translation speed is automatically limited to a permissible value.

It is also possible to employ another hydraulic system layout performing the same function but including only two towing motors: one being supplied with a reduced pressure to ensure strip tensioning while the other acts in the opposite direction.

The device, in accordance with this invention, may be used each time a load or vehicle, especially a wheeled vehicle, is to be securely displaced upon an oscillating surface. It is mainly applicable to the displacement of aircraft on board ships; the transport of loads which have been unloaded by hoisting from a helicopter on a ship or on a derrick platform under heavy sea conditions; a ground based oscillating or tiltable test platform used for testing, regardless of the limits, the behavior of wheeled vehicles such as aircraft, tractors, lift trucks, motor cars and especially the adherence of the tires of such vehicles.

Figure 2:
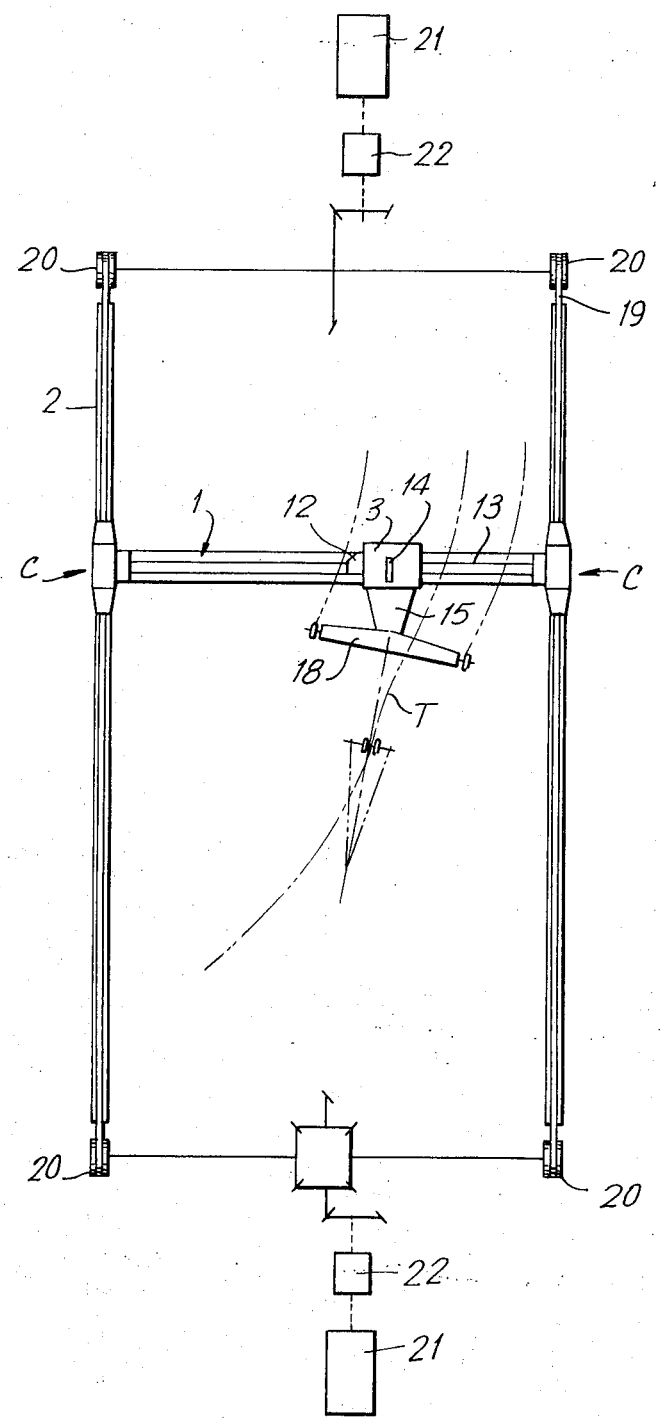
FIG. 2 is a schematic plan view of the device.

In operation, the vehicle is oriented in the direction of the intended trajectory T, either externally by a manual effort as shown in FIG. 1 or by turning the steering wheel from within the vehicle as diagrammatically illustrated in FIG. 2. The cross beam 1 is driven longitudinally along the rails 2 by suitable operation of motor pairs 21 and 22 and the cross slide 3 will move along beam 1 so that the vehicle will follow the trajectory T. It is to be understood that the slide 3 moves along beam 1 under the action of the force component developed by the inclination of the vehicle relative to the direction of travel of beam 1 along rails 2.

What is claimed is:

1. Apparatus for displacing an object on a horizontal surface, which can be tilted and can oscillate, along a desired trajectory between any two points on said surface, said apparatus comprising a rigid elongated cross beam having a longitudinal axis, means for displacing said cross beam on said surface at an angle relative to the longitudinal axis of the cross beam, a slide member slidably supported on said cross beam for longitudinal displacement therealong, said object resting on and being movable on said surface and means on said slide member for attachment to the object to be displaced to produce displacement of the slide member in response to external orientation of the object itself on said surface, said slide member being freely movable along said cross beam under the action of a load component applied thereto by the object when the latter is externally oriented on said surface in the direction of an intended trajectory which is inclined relative to the direction of displacement of the cross beam.

2. Apparatus as claimed in claim 1 wherein said cross beam is displaced at right angles to its longitudinal axis.

3. Apparatus as claimed in claim 1 comprising braking means between said slide member and cross beam.

4. Apparatus as claimed in claim 3 wherein said braking means includes a multiple blade brake comprising fixed blades arranged along the cross beam and movable tightening blades carried by the slide member, the movable blades being adapted for being applied by spring action in a braking operation and released by the control of the operator.

5. Apparatus as claimed in claim 1 wherein said means on the slide member for attachment to the object comprises a cross bar coupled to the slide member for limited pivotal movement in a horizontal plane.

6. Apparatus as claimed in claim 1 comprising means for guiding said cross beam in the course of its displacement.

7. Apparatus as claimed in claim 6 wherein the guiding means comprises a pair of substantially parallel rails, and carriages slidable on said rails and mounted on said cross beam at the ends thereof, the means for displacing the cross beam being attached to said carriages.

8. Apparatus as claimed in claim 7 wherein each said carriage comprises a core having opposite ends, and pads pivotably connected to said core at said ends and slidable on said rails.

9. Apparatus as claimed in claim 8 wherein the rails are profiled, said means for displacing the cross beam comprising strip means attached to each said carriage and displaceable within said rails, and means for winding and unwinding said strip means to cause the carriages to travel on said rails.

10. Apparatus as claimed in claim 9 wherein the means for winding and unwinding the strip means comprises at least two automatically slaved motors, one for towing and one for tensioning to provide sufficient tensioning of the strip means in any configuration of the object, thus allowing correct winding and unwinding of the strip means.

11. Apparatus as claimed in claim 7 comprising a hinge pin hingeably joining each carriage to a respective end of the cross beam, one of the hinge pins being fitted with a lateral clearance to allow relative shifting of the carriages and to overcome snug fit tolerances.

* * * * *